(12) United States Patent
Sun

(10) Patent No.: US 7,277,587 B2
(45) Date of Patent: Oct. 2, 2007

(54) SYSTEM AND METHOD FOR LOSSLESS VIDEO CODING

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 768 days.

(21) Appl. No.: 10/373,299

(22) Filed: Feb. 24, 2003

(65) Prior Publication Data

US 2003/0202705 A1 Oct. 30, 2003

Related U.S. Application Data

(60) Provisional application No. 60/319,209, filed on Apr. 26, 2002.

(51) Int. Cl.
*G06K 9/36* (2006.01)
(52) U.S. Cl. .................. 382/236; 382/238; 382/232
(58) Field of Classification Search ............... 382/232, 382/236, 238; 375/240.12, 240.15; 714/747
See application file for complete search history.

(56) References Cited

U.S. PATENT DOCUMENTS

| | | | |
|---|---|---|---|
| 5,668,598 A * | 9/1997 | Linzer et al. .......... 375/240.15 |
| 5,724,369 A * | 3/1998 | Brailean et al. ............ 714/747 |
| 5,796,864 A | 8/1998 | Callahan ..................... 382/166 |
| 6,473,532 B1 | 10/2002 | Sheraizin et al. ........... 382/244 |
| 6,647,061 B1 * | 11/2003 | Panusopone et al. .. 375/240.12 |

FOREIGN PATENT DOCUMENTS

WO    WO 0231687    5/2002

* cited by examiner

*Primary Examiner*—Anh Hong Do
(74) *Attorney, Agent, or Firm*—Law Office of Gerald Maliszewski; Gerald Maliszewski

(57) ABSTRACT

A lossless video coding method is provided. The method comprises: accepting a current input macroblock (MB) of pixel information; subtracting a current prediction MB from the current input MB, creating a current difference MB; entropy encoding the current difference MB with current predictive information; summing the current difference MB with the current prediction MB, creating a current summed MB; buffering the current summed MB, creating a current buffered MB; and, using buffered MBs to generate a subsequent prediction MB and subsequent predictive information, for subsequently accepted input MBs. Generating a subsequent prediction MB and subsequent predictive information includes using either inter-mode or intra-mode coding. The method may further comprise: transmitting the entropy encoded MB; sending a predetermined quantization parameter (QP), signaling that the entropy encoded MB is losslessly encoded; and, losslessly decoding.

27 Claims, 3 Drawing Sheets

Fig. 1 *(PRIOR ART)*

SYSTEM AND METHOD FOR LOSSLESS VIDEO CODING

RELATED APPLICATIONS

This application claims the benefit of a provisional application entitled, METHODS AND SYSTEMS FOR LOSSLESS CODING AND QP RANGE SELECTION, invented by Shijun Sun, Ser. No. 60/319,209, filed Apr. 26, 20002.

BACKGROUND OF THE INVENTION

1. Field of the Invention

This invention generally relates to video signal processing and, more particularly, to a system and method for losslessly coding video information.

2. Description of the Related Art

Lossless video coding is important for applications such as medical imaging, satellite imaging, digital cinema, where there are technical or legal reasons to prevent any loss of information. However, so far, most video coding standards, such as H.261, H.263, H.263+, MPEG-1, MPEG-2, and MPEG-4, have not addressed this need.

H.26L, also known as MPEG-4 Part 10, Advanced Video Coding (AVC) or ITU-T H.264, is an up-coming video coding standard being developed through the Joint Video Team (JVT) of ITU-T VCEG (video Coding Expert Group) and ISO/IEC MPEG. H.26L has demonstrated much higher compression ratio than existing standards, such as H.263+ and MPEG-4 Advanced Simple Profile (ASP).

FIG. 1 is a schematic block diagram illustrating the basic architecture of an H.26L encoder framework (prior art). The framework inherited the popular hybrid DPCM/transform approach, which has been adopted in many earlier video-coding standards. However, like most existing video coding standard, at this point H.26L does not support lossless video coding, which is enabled by other image coding standards, such as Motion JPEG 2000.

As noted by Ian Richardson (H.264/MPEG-4 Part 10 White Paper, www.vcodex.com), broadcast television and home entertainment have been revolutionized by the advent of digital TV and DVD-video. These applications, and many more, are made possible by the standardization of video compression technology. The next standard in the MPEG series, MPEG4, is enabling a new generation of Internet-based video applications whilst the ITU-T H.263 standard for video compression is now widely used in videoconferencing systems.

MPEG4 (Visual) and H.263 are standards that are based on video compression ("video coding") technology from circa. 1995. The groups responsible for these standards, the Motion Picture Experts Group (MPEG) and the Video Coding Experts Group (VCEG) are in the final stages of developing a new standard that promises to significantly outperform MPEG4 and H.263, providing better compression of video images together with a range of features supporting high-quality, low-bitrate streaming video. The history of the new standard, "Advanced Video Coding" (AVC), goes back at least 7 years.

After finalizing the original H.263 standard for videotelephony in 1995, the ITU-T Video Coding Experts Group staffed work on two further development areas: a "short-term" effort to add extra features to H.263 (resulting in Version 2 of the standard) and a "long-term" effort to develop a new standard for low bitrate visual communications. The long-term effort led to the draft "H.26L" standard, offering significantly better video compression efficiency than previous ITU-T standards. In 2001, the ISO Motion Picture Experts Group recognized the potential benefits of H.26L and the Joint Video Team (JVT) was formed, including experts from MPEG and VCEG. JVT's main task is to develop the draft H.26L "model" into a full International Standard. In fact, the outcome will be two identical standards: ISO MPEG4 Part 10 of MPEG4 and ITU-T H.264. The "official" title of the new standard is Advanced Video Coding (AVC). However, it is widely known by its old working title, H.26L and by its ITU document number, H.264.

In common with earlier standards (such as MPEG1, MPEG2 and MPEG4), the H.264 draft standard does not explicitly define a CODEC (enCOder/DECoder pair). Rather, the standard defines the syntax of an encoded video bitstream, referred to herein an entropy encoded macroblocks, together with the method of decoding this bitstream. In practice, however, a compliant encoder and decoder are likely to include the functional elements shown in FIG. 1. Whilst the functions shown are likely to be necessary for compliance, there is scope for considerable variation in the structure of the CODEC. The basic functional elements (prediction, transform, quantization, entropy encoding) are little different from previous standards (MPEG1, MPEG2, MPEG4, 11.261, H.263). The important changes in H.264 occur in the details of each functional element.

The encoder includes two dataflow paths, a "forward" path and a "reconstruction" path. An input frame or macroblock, is presented for encoding. The frame is processed in units of a macroblock (MB), corresponding to 16×16 pixels in the original image. Each macroblock is encoded in intra or inter-mode. In either ease, a prediction macroblock is formed based on a reconstructed frame. In intra-mode, the prediction MB is formed from samples in the current frame that have previously encoded, decoded and reconstructed. In inter-mode, the prediction MB is formed by motion-compensated prediction from one or more reference frame(s). The reference frame is the previous encoded frame. However, the prediction for each macroblock may be formed from one or two past or future frames (in time order) that have already been encoded and reconstructed.

The prediction MB is subtracted from the current macroblock to produce a residual or difference macroblock. This is transformed (using a block transform) and quantized to give X, a set of quantized transform coefficients. These coefficients are re-ordered and entropy encoded. The entropy-encoded coefficients, together with side information required to decode the macroblock (such as the macroblock prediction mode, quantizer step size, motion vector information describing how the macroblock was motion-compensated, etc) form the compressed, or encoded bitstream. This is passed to a Network Abstraction Layer (NAL) for transmission or storage.

The quantized macroblock coefficients X are decoded in order to reconstruct a frame for encoding of further macroblocks. The coefficients X are re-scaled and inverse transformed to produce a difference macroblock. This is not identical to the original difference macroblock as the quantization process introduces losses. Therefore, the recovered MB is a distorted version of the original MB.

It would be advantageous if a lossless H.26L or MPEG video encoding process existed.

SUMMARY OF THE INVENTION

The present invention describes a lossless video-coding algorithm based on the existing H.26L test model. The lossless coding algorithm simply skips the transform and quantization operations in H.26L. Therefore, the main elements in this lossless coding algorithm are motion compensation, intra (or inter) prediction, and entropy coding.

Accordingly, a lossless video coding method is provided. The method comprises: accepting a current input macroblock (MB) of pixel information; subtracting a current prediction MB from the current input MB, creating a current difference MB; entropy encoding the current difference MB with current predictive information; summing the current difference MB with the current prediction MB, creating a current summed MB; buffering the current summed MB, creating a current buffered MB; and, using buffered MBs to generate a subsequent prediction MB and subsequent predictive information, for subsequently accepted input MBs. Generating a subsequent prediction MB and subsequent predictive information includes using either inter-mode or intra-mode coding.

The method may further comprise: transmitting the entropy encoded MB; sending a predetermined quantization parameter (QP), signaling that the entropy encoded MB is losslessly encoded; and, losslessly decoding. When inter-mode coding is used, the subsequent prediction MB and subsequent predictive information are also responsive to the current input MB.

In some aspects of the method, entropy encoding the current difference MB with current predictive information includes using a process such as context-based adaptive binary coding (CABAC) or variable-length coding (VLC).

Additional details of the above-described method and lossless encoding system are described below.

DETAILED DESCRIPTION OF THE PREFERRED EMBODIMENTS

Figure 2:
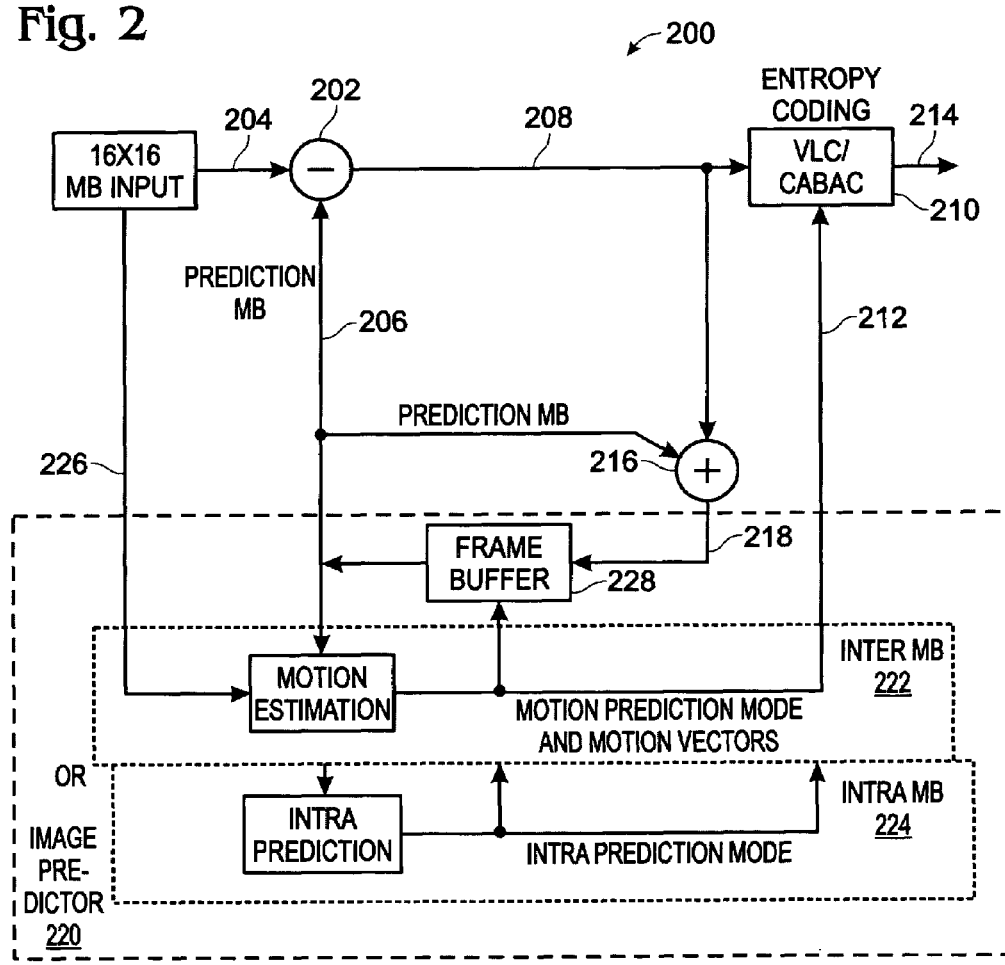
FIG. 2 is a schematic block diagram of the present invention lossless video encoding system.

FIG. 2 is a schematic block diagram of the present invention lossless video encoding system. The system 200 comprises a subtracting unit 202 having an input on line 204 to accept a current input macroblock (MB) of pixel information and an input on line 206 to accept a current prediction MB. The subtracting unit 202 subtracts the current prediction MB from the current input MB to supply a current difference MB at an output on line 208. Typically, the subtracting unit 202 accepts 16×16 pixel MBs. However, the present invention is not limited to any particular block size.

An entropy encoder 210 has an input connected to the subtracting unit output on line 208 to accept the current difference MB and input on line 212 to accept current predictive information. The entropy encoder 210 encodes the current difference MB in response to the current predictive information to supply a current encoded MB, or current entropy encoded MB at an output on line 214. Typically, the entropy encoder 210 encodes using a process of either context-based adaptive binary coding (CABAC), or variable-length coding (VLC). In some aspects of the system 200, the entropy encoder 214 transmits a predetermined quantization parameter (QP) with the entropy encoded MB on line 214, signaling that the entropy encoded MB is losslessly encoded. For example, the quantization parameter (QP) zero value can be used.

A summing unit 216 has an input connected to the subtracting unit output on line 208 to accept the current difference MB and an input on line 206 to accept the current prediction MB. The summing unit 216 adds the current difference MB to the current prediction MB to supply a current summed MB at an output on line 218.

An image predictor 220 has an input connected to the summing unit on line 218 to accept summed MBs and an output on line 206 to supply a subsequent prediction MB. The image predictor 220 also has an output on line 212 to supply subsequent predictive information. The image predictor 220 generates the subsequent prediction MB on line 206 and subsequent predictive information on line 212 in response to either an inter-mode coding subsystem 222 or an intra-mode coding subsystem 224.

If a macroblock is encoded using the intra-mode subsystem 222, a prediction MB is formed based on previously encoded and reconstructed blocks. This prediction MB is subtracted from the current block prior to encoding. For the luminance (luma) samples, the prediction MB may be formed for each 4×4 sub-block or for a 16×16 macroblock. There are 9 optional prediction modes for each 4×4 luma block and 4 optional modes for a 16×16 luma block. Therefore, when the image predictor 222 uses the intra-mode coding subsystem 224, the subsequent prediction MB mode can be generated from one of nine 4×4 luma block modes, four 16×16 luma block modes, or four 8×8 chroma block modes.

In some aspects of the system 200, the image predictor 220 includes a buffer 228 to store the current summed MB on line 218, creating a current buffered MB. The image predictor 220 generates a subsequent prediction MB on line 206 and subsequent predictive information on line 212 in response to using the current buffered MB. In other aspects, the image predictor 220 generates a subsequent prediction MB and subsequent predictive information in response to also using previously buffered MBs, accepted before the current buffered MB.

Intra-mode coding is well understood by those skilled in the art, and additional details of the process are not necessary for an understanding of the present invention.

As shown, the image predictor 220 has an additional input on line 226 to accept the current input MB when the image predictor 220 generates the subsequent prediction MB on line 206 and subsequent predictive information on line 212 in response to using the inter-mode coding subsystem 222.

Inter-mode coding creates a prediction MB from one or more previously encoded video frames by shifting samples in the reference frame(s) (motion compensated prediction). This block-based motion compensation has been a principle of every major coding standard since H.261. H.264, unlike earlier standards, supports a range of block sizes, down to fine sub-pixel motion vectors (¼ pixel in the luma component). The motion compensation block sizes may range from 16×16 to 4×4 luminance samples. Each of the sub-divided regions is a macroblock partition, which may be split even further. This method of partitioning macroblocks into motion compensated sub-blocks of varying size is known as tree structured motion compensation.

A separate motion vector is required for each partition or sub-partition. Each motion vector must be coded and transmitted, and the choice of partition(s) must also be encoded.

Choosing a large partition size means that a small number of bits are required to signal the choice of motion vector(s) and the type of partition. However, the motion compensated residual may contain a significant amount of energy in frame areas with high detail. Choosing a small partition size may give a lower-energy residual after motion compensation, but requires a larger number of bits to signal the motion vectors and choice of partition(s). The choice of partition size therefore has a significant impact on compression.

Therefore, the image predictor 220 uses the inter-mode coding subsystem 222 to select a motion compensation block size in the range between 16×16 to 4×4 luminance samples, and generate a separate motion vector for each separate block. As noted above, the image predictor 220 may also selects a luma component sub-pixel resolution block.

In some aspects of the system 200, the image predictor 220 generates a subsequent prediction MB on line 206 and subsequent predictive information on line 212 in response to using the current buffered MB (supplied by buffer 228). In other aspects, the image predictor 220 generates a subsequent prediction MB and subsequent predictive information in response to previously buffered MBs, accepted before the current buffered MB.

Inter-mode coding is well understood by those skilled in the art, and additional details of the process are not necessary for an understanding of the present invention.

Functional Description

Figure 1:
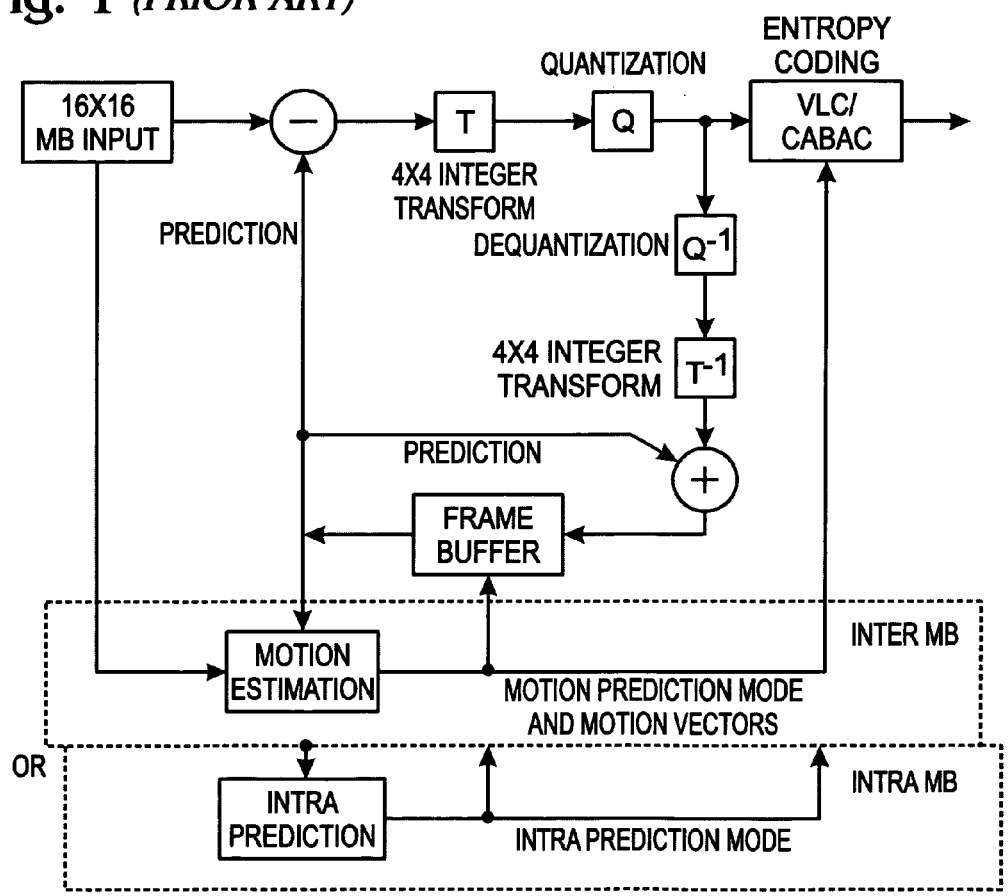
FIG. 1 is a schematic block diagram illustrating the basic architecture of an H.26L encoder framework (prior art).

Since the transform and quantization operations in H.26L typically cause data loss due to rounding or truncation, these processes are not suitable for lossless video coding. The present invention lossless coding algorithm, as illustrated in FIG. 2, simply skips the transform and quantization operations shown in FIG. 1. Thus, the main elements in this lossless coding algorithm are intra prediction, entropy coding, and inter-frame motion compensation tools from H.26L. The lossless coding may be signaled using the zero value Quantization Parameter (QP).

Experiments were conducted using H.26L test model JM4.3 and thirteen test sequences, in either CIF or QCIF format, which are used in most H.26L core experiments. The H.26L lossless coding results are compared against the Motion JPEG2000 results.

Each sequence is coded as one I frame followed by all P frames; no B frame is inserted. The number of reference frames is 5. All MB modes are enabled for the motion compensation. The results are shown in Table 1. Compared to Motion JPEG2000, where inter coding is applied, H.26L with CABAC enables relative bit reduction of 32%, while the lower-complexity VLC gives a relative bit reduction of 24% on average.

Figure 3:
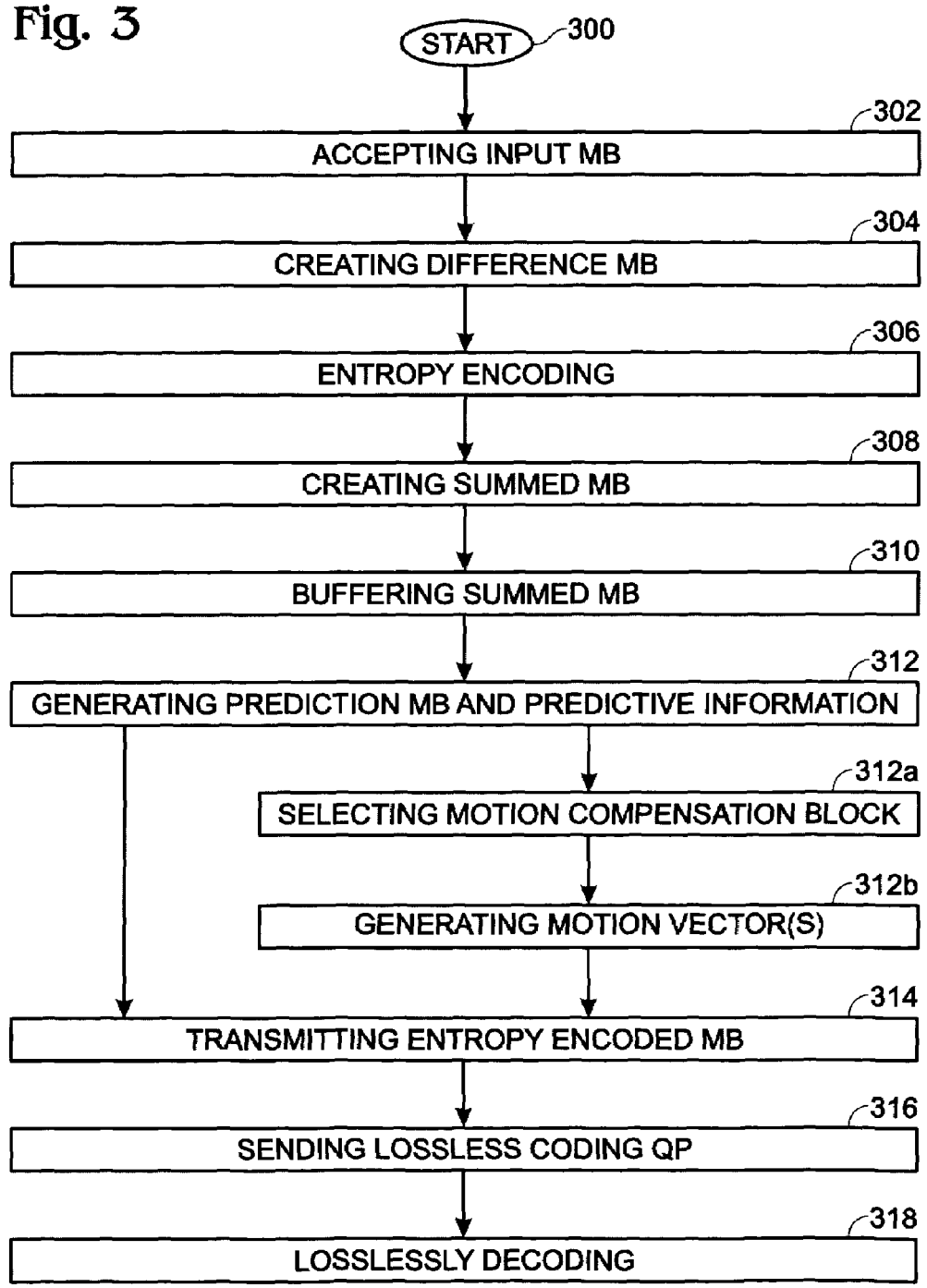
FIG. 3 is a flowchart illustrating the present invention lossless video coding method.

FIG. 3 is a flowchart illustrating the present invention lossless video coding method. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300.

Step 302 accepts a current input macroblock (MB) of pixel information. Step 304 subtracts a current prediction MB from the current input MB, creating a current difference MB. Step 306 entropy encodes the current difference MB with current predictive information. Step 308 sums the current difference MB with the current prediction MB, creating a current summed MB. Step 310 buffers the current summed MB, creating a current buffered MB. Step 312 uses buffered MBs to generate a subsequent prediction MB and subsequent predictive information, for subsequently accepted input MBs.

In some aspects, Step 314 transmits the entropy encoded MB. Step 316 sends a predetermined quantization parameter (QP), signaling that the entropy encoded MB is losslessly encoded. Step 318 losslessly decodes the input MB in response to receiving the entropy encoded MB and the lossless coding QP. The decoding process is essentially the reverse of the coding process, as would be well understood in the art.

Generating a subsequent prediction MB and subsequent predictive information in Step 312 includes using an algorithm such as inter-mode or intra-mode coding.

When Step 312 uses inter-mode coding, the subsequent prediction MB and subsequent predictive information are further responsive to the current input MB. Then, generating a subsequent prediction MB and subsequent predictive information in Step 312 includes substeps. Step 312a selects a motion compensation block size in the range between

TABLE 1

Compression ratio of lossless video coding with H.26L inter coding tools

| sequence | frames coded | frame rate | frame width | frame height | bits/pel | bitrate (CAB4C) | compression ratio (CABAC) | bitrate (ULVC) | compression ratio (UVLC) | lossless (JPG2K) |
|---|---|---|---|---|---|---|---|---|---|---|
| container_qcif | 100 | 10 | 176 | 144 | 12 | 837156 | 3.63 | 968989 | 3.14 | 2.11 |
| news_gcif | 100 | 10 | 176 | 144 | 12 | 646549 | 4.70 | 717434 | 4.24 | 2.13 |
| foreman_qcif | 100 | 10 | 176 | 144 | 12 | 1129955 | 2.69 | 1350145 | 2.25 | 2.04 |
| silent_qcif | 150 | 15 | 176 | 144 | 12 | 1193997 | 3.82 | 1259146 | 3.62 | 1.97 |
| paris_cif | 150 | 15 | 352 | 288 | 12 | 6138711 | 2.97 | 7040500 | 2.59 | 1.87 |
| mobile_cif | 300 | 30 | 352 | 288 | 12 | 16631278 | 2.19 | 18159674 | 2.01 | 1.53 |
| tempete_cif | 260 | 30 | 352 | 288 | 12 | 15828357 | 2.31 | 17441418 | 2.09 | 1.81 |
| coast_cif | 300 | 30 | 352 | 288 | 12 | 14652195 | 2.49 | 16251118 | 2.25 | 2.03 |
| stefan_cif | 300 | 30 | 352 | 288 | 12 | 16842430 | 2.17 | 18619028 | 1.96 | 1.95 |
| stefan_qcif | 150 | 15 | 176 | 144 | 12 | 2209871 | 2.06 | 2421956 | 1.88 | 1.67 |
| foreman_cif | 300 | 30 | 352 | 288 | 12 | 13083436 | 2.79 | 14903687 | 2.45 | 2.18 |
| bus_cif | 150 | 30 | 352 | 288 | 12 | 15724645 | 2.32 | 17491092 | 2.09 | 1.97 |
| flower_30Hz_cif | 250 | 30 | 352 | 288 | 12 | 14005933 | 2.61 | 15401182 | 2.37 | 1.83 |
| average | | | | | | | 2.83 | | 2.53 | 1.93 |

16×16 to 4×4 luminance samples. Step 312b generates a motion vector for each separate block. In other aspects, selecting a motion compensation block size in Step 312a further includes selecting a luma component sub-pixel resolution block.

In some aspects of the method, using buffered MBs to generate a subsequent prediction MB and subsequent predictive information in Step 312 includes using the current buffered MB. In other aspects, Step 312 uses previously buffered MBs, created in response to previously accepted input MBs.

When Step 312 generates a subsequent prediction MB and subsequent predictive information using intra-mode coding, the subsequent prediction MB is generated in a mode selected from the following options: nine 4×4 luma block modes, four 16×16 luma block modes, and four 8×8 chroma block modes.

As with the inter-mode, using buffered MBs to generate a subsequent prediction MB and subsequent predictive information in Step 312 may include using the current buffered MB. Further, the subsequent prediction MB and subsequent predictive information may be generated using previously buffered MBs, created in response to previously accepted input MBs.

In some aspects of the method, accepting a current input macroblock (MB) of pixel information in Step 302 includes accepting a 16×16 pixel MB. However, the present method could be enabled using any block size.

In some aspects, entropy encoding the current difference MB with current predictive information in Step 306 includes encoding using a process selected from the group such as context-based adaptive binary coding (CABAC) or variable-length coding (VLC).

A system and method for losslessly encoding video has been presented. Some examples have been presented in the context of the H.264 protocol. However, the invention is not limited to merely these examples. Other variations and embodiments of the invention will occur to those skilled in the art.

I claim:

1. In a video coding device, a signal bearing medium tangibly embodying a program of machine-readable instructions executable by a digital processing apparatus to perform a method for lossless video coding, the method comprising:
   accepting a current input macroblock (MB) of pixel information;
   subtracting a current prediction MB from the current input MB, creating a current difference MB;
   without transforming and quantizing the current difference MB, entropy encoding the current difference MB with current predictive information;
   summing the current difference MB with the current prediction MB, creating a current summed MB;
   buffering the current summed ME, creating a current buffered MB; and,
   using buffered MBs to generate a subsequent prediction MB and subsequent predictive information, for subsequently accepted input MBs.

2. The method of claim 1 wherein generating a subsequent prediction MB and subsequent predictive information includes using an algorithm selected from the group including inter-mode and intra-mode coding.

3. The method of claim 1 wherein generating a subsequent prediction MB and subsequent predictive information includes using inter-mode coding to generate the subsequent prediction MB and subsequent predictive information in response to the current input MB.

4. The method of claim 1 further comprising:
   transmitting the entropy encoded MB; and,
   sending a predetermined quantization parameter (QP), signaling that the entropy encoded MB is losslessly encoded.

5. The method of claim 4 further comprising:
   loeslessly decoding the input MB in response to receiving the entropy encoded MB and the lossless coding QP.

6. The method of claim 1 wherein accepting a current input macroblock (MB) of pixel information includes accepting a 16×16 pixel MB.

7. The method of claim 1 wherein generating a subsequent prediction MB and subsequent predictive information includes using intra-mode coding to generate a subsequent prediction MB mode selected from the group including nine 4×4 luma block modes, four 16×16 luma block modes, and four 8×8 chroma block modes.

8. The method of claim 7 wherein using buffered MBs to generate a subsequent prediction MB and subsequent predictive information includes using the current buffered MB.

9. The method of claim 8 wherein using buffered MBs to generate a subsequent prediction MB and subsequent predictive information includes using previously buffered MBs, created in response to previously accepted input MBs.

10. The method of claim 1 wherein generating a subsequent prediction MB and subsequent predictive information includes using inter-mode coding to:
    select a motion compensation block size in the range between 16×46 to 4×4 luminance samples; and,
    generate a motion vector for each separate block.

11. The method of claim 10 wherein selecting a motion compensation block size further includes selecting a luma component sub-pixel resolution block.

12. The method of claim 10 wherein using buffered MBs to generate a subsequent prediction MB and subsequent predictive information includes using the current buffered MB.

13. The method of claim 12 wherein using buffered MBs to generate a subsequent prediction MB and subsequent predictive information includes using previously buffered MBs, created in response to previously accepted input MBs.

14. The method of claim 1 wherein entropy encoding the current difference MB with current predictive information includes encoding using a process selected from the group including context-based adaptive binary coding (CALBAC) and variable-length coding (VLC).

15. A lossless video encoding system, the system comprising:
    a subtracting unit having an input to accept a current input macroblock (MB) of pixel information and an input to accept a current prediction MB, the subtracting unit subtracting the current prediction MB from the current input MB to supply a current difference MB at an output which has not been transformed and quantizied;
    an entropy encoder having an input connected to the subtracting unit output to accept the current difference MB and input to accept current predictive information, the entropy encoder encoding the current difference MB in response to the current predictive information to supply a current encoded MB at an output;
    a summing unit having an input connected to the subtracting unit output to accept the current difference MB and an input to accept the current prediction MB, the summing unit adding the current difference MB to the current prediction MB to supply a current summed MB at an output; and, an image predictor having an input connected to the summing unit to accept summed MBs, an output to supply a subsequent prediction MB, and an output to supply subsequent predictive information.

16. The system of claim 15 wherein the image predictor generates the subsequent prediction MB and subsequent predictive information in response to coding selected from the group including an inter-mode coding subsystem and an intra-mode coding subsystem.

17. The system of claim 16 wherein the image predictor has an additional input to accept the current input MB, and wherein the image predictor generates the subsequent prediction MB and subsequent predictive information in response to the inter-mode coding subsystem.

18. The system of claim 15 wherein the entropy encoder transmits a predetermined quantization parameter (QP) with the entropy encoded MB, signaling that the entropy encoded MB is losslessly encoded.

19. The system of claim 15 wherein the subtracting unit accepts 16×16 pixel MBs.

20. The system of claim 15 wherein the image predictor uses an intra-mode coding subsystem to generate a subsequent prediction MB mode selected from the group including nine 4×4 luma block modes, four 16×16 luma block modes, and four 8×8 chroma block modes.

21. The system of claim 20 wherein the image predictor includes a buffer to store the current summed MB, creating a current buffered MB; and,
wherein the image predictor generates a subsequent prediction MB and subsequent predictive information in response to using the current buffered MB.

22. The system of claim 21 wherein the image predictor generates a subsequent prediction MB and subsequent predictive information in response to previously buffered MBs, accepted before the current buffered MB.

23. The system of claim 15 wherein the image predictor uses an inter-mode coding subsystem to:
select a motion compensation block size selected from a range between 16×16 to 4×4 luminance samples; and,
generate a separate motion vector for each separate block.

24. The system of claim 23 wherein the image predictor selects a luma component sub-pixel resolution block.

25. The system of claim 23 wherein the image predictor includes a buffer to store the current summed MB, creating a current buffered MB; and,
wherein the image predictor generates a subsequent prediction MB and subsequent predictive information in response to using the current buffered MB.

26. The system of claim 25 wherein the image predictor generates a subsequent prediction MB and subsequent predictive information in response to previously buffered MBs, accepted before the current buffered MB.

27. The system of claim 15 wherein entropy encoder encodes using a process selected from the group including context-based adaptive binary coding (CABAC) and variable-length coding (VLC).

* * * * *

UNITED STATES PATENT AND TRADEMARK OFFICE
CERTIFICATE OF CORRECTION

PATENT NO. : 7,277,587 B2  Page 1 of 1
APPLICATION NO. : 10/373299
DATED : October 2, 2007
INVENTOR(S) : Shijun Sun It is certified that error appears in the above-identified patent and that said Letters Patent is hereby corrected as shown below:

In col. 8, line 7, of claim 5, the word "losslessly" has been incorrectly printed as the word "loeslessly". Claim 5 should read as follows:

--5. The method of claim 4 further comprising:
losslessly decoding the input MB in response to receiving the entropy encoded MB and the lossless coding QP.--

In col. 8, line 29, of claim 10, the term "16x16" has been incorrectly printed as "16x46". Claim 10 should read as follows:

--10. The method of claim 1 wherein generating a subsequent prediction MB and subsequent predictive information includes using inter-mode coding to:
select a motion compensation block size in the range between 16x16 to 4x4 luminance samples; and, generate a motion vector for each separate block.--

Signed and Sealed this

Eighteenth Day of December, 2007

JON W. DUDAS
*Director of the United States Patent and Trademark Office*